United States Patent [19] [11] Patent Number: 5,028,186
McSherry [45] Date of Patent: Jul. 2, 1991

[54] HOLLOW WALL ANCHOR WITH ENHANCED HOLDING STRENGTH

[75] Inventor: Thomas W. McSherry, Stamford, Conn.

[73] Assignee: Mechanical Plastics Corp., Pleasantville, N.Y.

[21] Appl. No.: 471,864

[22] Filed: Jan. 29, 1990

[51] Int. Cl.5 .............................................. F16B 13/04
[52] U.S. Cl. ....................................... 411/34; 411/55; 411/37; 411/908; 411/340
[58] Field of Search ........................ 411/34, 35, 37, 38, 411/55, 340, 344, 345, 908

[56] References Cited

U.S. PATENT DOCUMENTS

| 3,651,734 | 3/1972 | McShrry | 411/15 |
| 4,197,781 | 4/1980 | Giannuzzi | 411/34 X |
| 4,306,824 | 12/1981 | Tanaka et al. | 411/34 |
| 4,397,595 | 8/1983 | Smith et al. | 411/34 X |
| 4,491,447 | 1/1985 | Smith et al. | 411/34 X |
| 4,704,057 | 11/1987 | McSherry | 411/55 |
| 4,828,439 | 5/1989 | Giannuzzi | 411/37 |
| 4,878,790 | 11/1989 | McSherry et al. | 411/34 |

Primary Examiner—Rodney M. Lindsey
Assistant Examiner—Suzanne L. Dino
Attorney, Agent, or Firm—Israel Nissenbaum

[57] ABSTRACT

A plastic hollow wall anchor having folding arms for insertion within a limited diameter aperture in a substrate such as a wall. The arms, adjacent their overlapping attachment areas, are configured to provide a "sharp knife edge" intersection, whereby a spacing between the attached arms, during folding and aperture insertion, is substantially eliminated. The load bearing arms are concomitantly thickened and thereby strengthened within the limited dimension afforded by the aperture. Alternatively, the overall dimensions of the anchor are reduced, while maintaining the load bearing arm dimensions, thereby enabling the use of a smaller diameter for the insertion aperture without decrease in anchor holding strength.

16 Claims, 3 Drawing Sheets

HOLLOW WALL ANCHOR WITH ENHANCED HOLDING STRENGTH

This invention relates to improvements in plastic hollow wall anchors and particularly to improvements in holding strength for hollow wall anchors such as described in U.S. Pat. No. 3,651,734 and sold throughout the world under the trademark TOGGLER.

Hollow wall anchors are designed to have a minimal diameter configuration for insertion in an aperture in a wall or other substrate. This is generally accomplished by either initially forming the anchor in what is called the "closed" or insertion position, e.g. the initially uniform diameter configuration of metal expansion anchors such as the Molly (trademark) anchor; or by folding normally outstretched arms of the anchor to the uniform diameter or size configuration, as with plastic anchors such as the TOGGLER screw anchor. With either of such anchors, after insertion of the anchor into the wall aperture, the anchor expands, or is expanded, whereby portions thereof grip the peripheral edges of the inner surface of the wall adjacent the aperture. The TOGGLER screw anchor (though not the Molly anchor) can also be utilized in solid walls whereby it remains in the folded configuration and the insertion of a screw causes it to function as an expansion plug type anchor.

A major factor affecting strength of the anchor, in hollow walls, is the thickness of the portions of the anchor which are closest to the peripheral edges of the aperture and which accordingly bear the greatest portion of the load, or in some anchors, the entire load. Increasing the thickness of these portions to support heavier loads, however, usually entails increasing the size of the aperture, as well, to accommodate the increased thickness of the arms This results in increased damage to the wall as well as increased installation effort, an unacceptable alternative. In fact, it is desirable to reduce aperture dimension. However, this entails thinning the arms with reduced holding strength, another unacceptable alternative.

It is an object of the present invention to provide a means whereby the load bearing portions of a hollow wall anchor can be thickened and strengthened without increasing the size of the insertion aperture.

It is a further object of the present invention to alternatively provide a means whereby the folded insertion diameter or cross section of the anchor is reduced and concomitantly the size of the insertion aperture is also reduced without significant loss in anchor holding strength.

It is a still further object of the present invention to provide a means whereby the load bearing strength of a plastic wall anchor in solid substrates can be increased without increasing the size of the anchor.

These and other objects, features and advantages of the present invention will become more apparent from the following discussion as well as the drawings in which.

Figure 1:
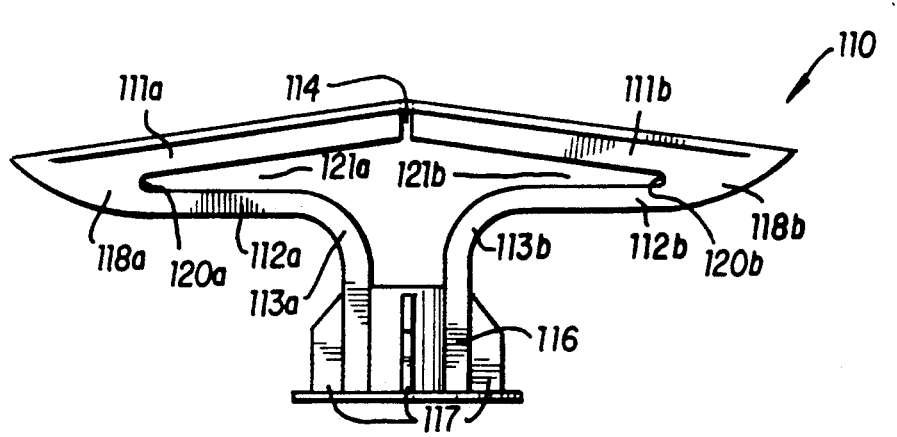
FIG. 1 is an elevation view of the prior art screw anchor sold under the TOGGLER trademark.

Hollow wall screw anchors, such as the plastic TOGGLER screw anchor, are generally integrally molded plastic fasteners comprised of a socket base element, usually having a bore for receiving an elongated external fastening member. The base element is integrally joined at one of its ends to hingeable webs, usually pillar-like in form, which extend outwardly away therefrom and merge with an anchoring element comprised of a pair of outstretched rear toggle arms. The outer ends of the rear toggle arms are each attached to one of a pair of front arms (in some anchors attachment is at a midpoint of either the front or rear arms) which, in turn, converge toward each other, usually to a hinge point or a close but separated convergence, at a position overlying the base element and an inner space in the fastening device. In use, the front and rear arms are folded together to form a collapsed anchoring element of the fastener which is insertable into an opening within a substrate such as a hollow wall or solid material. In hollow walls or thin substrates, the anchoring element expands, or is expanded after passing through the opening to assume the anchoring position. A fastening element, such as a screw, is threadably inserted into the bore of the base element and into engagement with the front arms at their point of convergence, above the base element, to form the fastening position of the anchor when fully expanded in hollow walls. In the expanded position of the anchoring element, the rear arms are adjacent the inner surface of the wall or substrate and bear the substantial portion of the load. The front arms, integrally attached to the rear arms, generally serve to help spread the rear arms into load-bearing position and to stabilize them in such position. In addition or alternatively, the front arms serve as a support between the inserted screw and the rear arms to prevent collapse of the anchoring element. With the TOGGLER screw anchor, prior to insertion within an aperture in the wall or substrate, the front arms (which are hinged together) are folded together between the rear arms to obtain a substantially uniform diameter or cross-section of minimal dimension suitable for insertion of all the arms into the aperture. The aperture is thus sized to accommodate the thicknesses of both the front and rear arms. In addition, the aperture is sized to also accommodate the spacing between the front and rear arms which cannot be eliminated by compressing the arms together. This spacing results from the requisites of plastic molding (the means by which plastic screw anchors are formed) wherein a radius of finite though small dimension is formed at the attachment or connection between front and rear arms by the introduction of a metal molding member therebetween. The radius, an artifact of the molding process, prevents the relatively rigid (as required for holding strength) front and rear arms from being fully compressed together. As a result, a portion of the restricted spacing in the insertion aperture merely accommodates the spacing between the front and rear arms, which spacing contributes nothing to the holding strength of the anchor.

Though the primary function of the plastic hollow wall screw anchors is to anchor items to hollow walls, some of these anchors can also be utilized as expansion plug anchors in solid walls. In this latter embodiment, the anchoring element remains in the folded configuration and the inserted screw expands the material of the arms into compressive frictional contact with the walls of the insertion hole. The aforementioned spacing between the front and rear arms, however, reduces the extent of the compressive frictional force being exerted by providing a free area into which the plastic can be moved by screw insertion.

Generally the present invention comprises a screw anchor in which there is the substantial elimination of the spacing between front and rear arms during the aperture insertion process. As a result, the load-bearing rear arms may be thickened, in the area of the substantially eliminated spacing, thereby strengthening the anchor. Alternatively, and in many instances, more desirably, the load bearing rear arms maintain their thickness with the rest of the anchor being downsized. As a result, a smaller aperture diameter is required for an anchor having substantially equivalent holding strength. In addition, for solid wall applications, elimination of the spacing increases the holding strength of the anchor or, as with hollow wall applications, the size of the anchor can be reduced without loss of holding strength.

In accordance with the present invention, the spacing between the front and rear arms is substantially eliminated by causing the front and rear arms to meet with a sharp knife-like edge rather than a radius at the point where they are abutted together. Since there is no adjacent spacing between front and rear arms, with the elimination of the radius, the front and rear arms can be fully abutted together without a spacing therebetween. However, the formation of a radius between front and rear arms is an artifact of the molding process and it cannot per se be readily eliminated. A molding "steel" member with a sharp knife edge, which would initially form the anchor without a radius or a smaller radius, would also be quickly worn down in production and would transmit excessive heat and degrade the molding of a particularly stressed area of the anchor. It is accordingly a preferred means for providing the sharp knife-like attachment.

In accordance with a highly preferred embodiment of the present invention, at each area of attachment between a front and rear arm, the area of facing surfaces of the arms, adjacent the inner radius of the attached front and rear arms, is bifurcated along the longitudinal axis extending from the base element to the point of attachment, into two areas of adjacent facing surfaces of the attached rear and front arms. These two areas deviate slightly, in opposite directions, from a plane which bisects the area between adjacent surfaces of the respective front and rear arms and are accordingly offset from each other.

At the point where the deviation of each of the offset areas returns to the plane of the adjacent surfaces of the respective front and rear arms, their adjacent intersection is a sharp apex point which, relative to each of the offset areas, provides the sharp knife-like edge rather than a radius. Compression between the front and rear arms follows from this point with a substantially abutting contact between the adjacent surfaces of the front and rear arms and the substantial elimination of the spacing of the prior art. Formation of the bifurcation and offset areas is readily accomplished, during initial molding, by the use, at each radius area, of two metal molding members which are slightly offset from each other to the extent of the offset desired for the bifurcated areas, instead of aligning the metal molding members.

It is preferred that the adjacent offset areas be mirror-image symmetrical to facilitate manufacturing and to minimize any undue twisting stress on unsymmetrically offset areas. It is also preferred that the extent of the offset be only sufficient to provide the requisite sharp knife-like edge at the intersection. A greater degree of offset would serve no additional purpose and could result in overly weakened front or rear arms at the point of offset because of thinning to accommodate the offset radius. Too little of an offset may provide an intersection with a smaller overall radius, with some reduction in spacing, but not a sharp knife-like edge and such embodiment is not as preferred.

While the present invention has its greatest applicability in improving the TOGGLER screw anchor, it has applicability to any screw anchor in which aperture-insertable members thereof are attached with a radius rather than a sharp knife-like edge and wherein a space between the members is created thereby. Elimination of such space similarly permits either thickening with strengthening of load-support members or down-sizing of the anchor without loss of strength, as described above.

Figure 2:
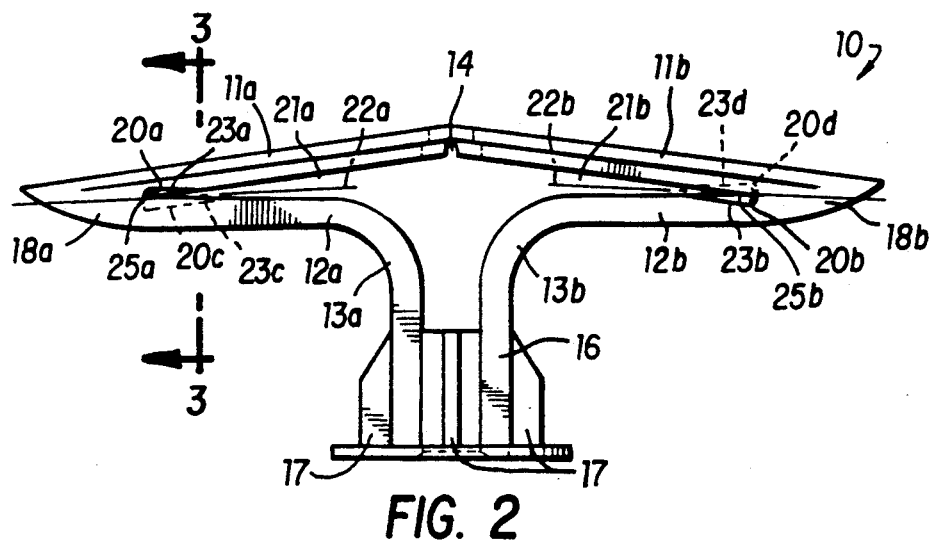
FIG. 2 is an elevation view of the screw anchor of FIG. 1, modified in accordance with the present invention.
Figure 3:
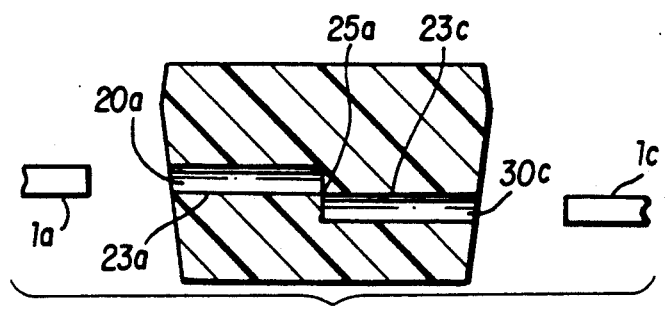
FIG. 3 is a cross section view of the anchor of FIG. 2 taken along line 3—3 with a partial view of the forming mold members.

With specific reference to the drawings, FIGS. 1 and 2 depict a comparison between the prior art TOGGLER screw anchor 110 and the same screw anchor 10 having the improvements of the present invention. Both anchors have body elements 116 and 16 with anti-rotation fins 117 and 17 respectively. The body element of each of the anchors have flexible webs 113a, 113b and 13a, 13b respectively, converge into rear toggle arms 112a, 112b and 12a, 12b respectively which in turn are attached to front toggle arms 111a, 111b and 11a, 11b at points 118a, 118b and 18a, 18b. Front arms 111a, 111b and 11a, 11b are hingedly connected at 114 and 14 respectively. Between adjacent pairs of front and rear arms, 111a–112a, 111b–112b, 11a–11a, and 11b–11b spacings 121a, 121b, 21a and 21b are formed. In the prior art anchor of FIG. 1, at their outer ends, rear toggle arms 112a and 112b are joined to front arms 111a and 111b, at attachment points 118a and 118b, with an inner radius at each respective attachment of 120a and 120b. In the anchor 10 of the present invention, the attachments between rear toggle arms 12a and 12b with front arms at attachment points 18a and 18b respectively are each bifurcated into radii 20a, 20c and 20b, 20d. One aligned longitudinal half of toggle arms 11a and 12a is attached through radius 20a and the other aligned longitudinal half of toggle arms 11a and 12a is attached through radius 20c. Portions 23a and 23c of the spacing 21a adjacent to and terminating in radii 20a and 20c deviate axially from the center plane 22a of the spacing in opposing directions. At a position 25a, between radii 20a, 20c and beginning of the deviation from the center plane 22a, portions 23a and 23c adjacently laterally intersect with the formation of a "sharp knife-edge". An identical configurational relationship occurs between toggle arms 11b and 12b, with the formation of separate radii 20b, 20d and portions 23b and 23d which deviate from center plane 22b, and laterally intersect at position 25b with a second "sharp knife edge". FIG. 3 representatively depicts the bifurcated radii 20a, 20c and adjacent lateral deviations of portions 23a, 23c from center plane 22a, as formed by offset steel molding members 1a and 1c (shown as being laterally removed), with the formation of the "sharp knife edge" intersection 25a. FIG. 3 is also exactly representative of bifurcated radii 20b, 20d and adjacent lateral deviations of portions 23b, 23d from center plane 22b formed by similar offset steel members with the formation of "sharp knife edge" intersection 25b.

Figure 4:
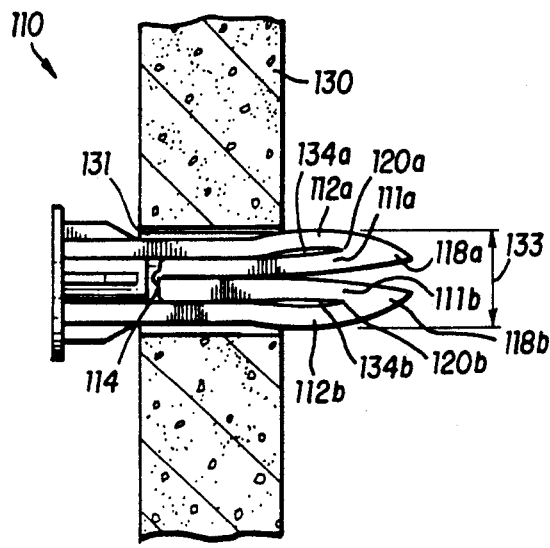
FIG. 4 is an elevation view of the prior art anchor of FIG. 1, folded up and being inserted in an aperture of a wall.
Figure 5:
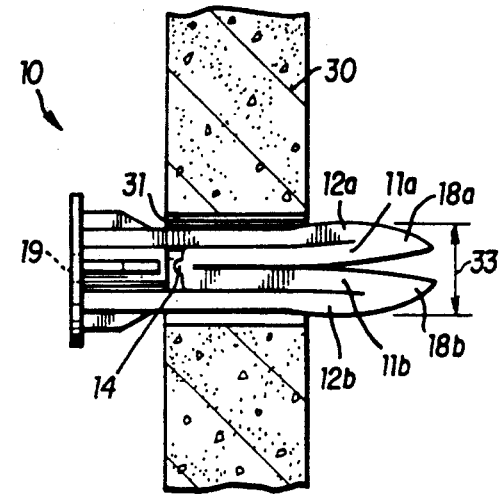
FIG. 5 is an elevation view of the anchor of FIG. 2, folded up and being inserted in an aperture of a wall.

When the front and rear toggle arms 11a, 11b and 12a, 12b are folded together for insertion within an aperture 31 in wall 30, as shown in FIG. 5, the adjacent surfaces of 11a, 12a and 11b, 12b are brought into substantially full contact, since they extend from "sharp knife edges" 25a and 25b, with the substantial elimination of a spacing therebetween. As seen in FIG. 4, the similar folding together of front and rear toggle arms 111a, 111b and 112a, 112b of the prior art screw anchor 110, results in spacings 134a and 134b (cumulatively equal to about 20% of the total cross-section of the folded arms) which cannot be collapsed because of the spring tension afforded by the radius attachments 120a and 120b with finite separations. As a result, the cross-section 33 of the folded anchor 10 of the present invention is at least about 20% less than that of the cross-section 133 of the folded prior art anchor 110. The anchor 10 of the present invention can thus be accommodated, without reduction of toggle arm thicknesses or strength, in an aperture 31 having a diameter 20% less than that required for the prior art screw anchor. Since the standard aperture is 5/16 inches in diameter, this translates into reduction in aperture size to ¼ inch and an overall reduction in aperture area of about 36%, all without reduction in holding strength of the anchor.

Alternatively, the thickness of the toggle arms 11a, 11b and 12a, 12b may be proportionately increased, to the extent enabled by the elimination of the spacing 134a and 134b of the prior art anchor, whereby anchor strength is increased without increase in the size of insertion aperture 31 over that of the prior art aperture 131.

Figure 6A:
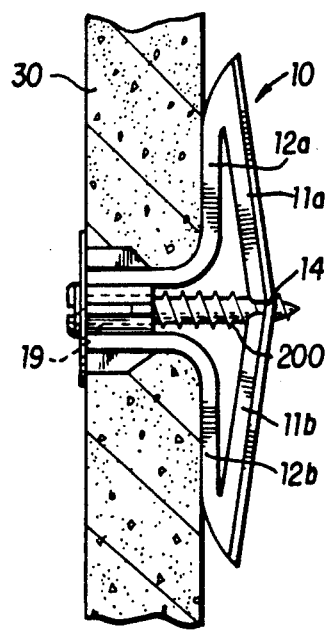
FIG. 6a is an elevation view of the anchor of FIG. 2 in anchoring position in a hollow wall.

Once the folded front and rear arms 11a, 11b and 12a, 12b pass the other end of the aperture 31 they expand or are expanded to the initial configuration shown in FIG. 2. Thereafter, as shown in FIG. 6a, a screw 200 is threadably inserted into bore 19 and further into engagement with the hinge connection 14 between front arms 11a, 11b to complete the full anchoring position. In this position it can be readily noted that the rear arms 12a, 12b support the load exerted on the head of screw 200 by an object fastened thereto. Accordingly, the thickness of the rear arms 12a, 12b is determinative of the strength of the anchor.

Figure 6B:
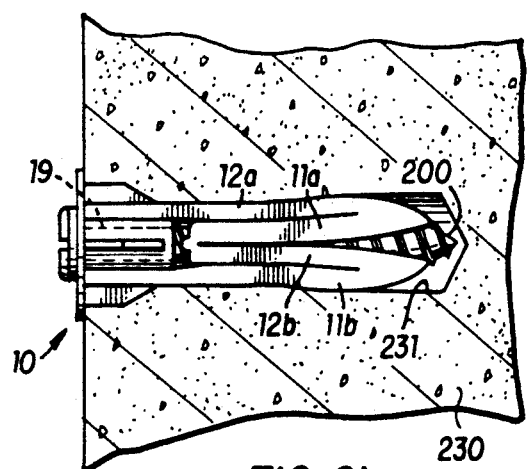
FIG. 6b is an elevation view of the anchor of FIG. 2 in anchoring position in a solid wall.

In the utilization embodiment shown in FIG. 6b, the wall 230 is solid and the front and rear arms 11a, 11b and 12a, 12b remain in the folded position. The inserted screw 200, is threadably inserted into bore 19 and thereafter between the attached pairs of front and rear arms 11a, 11b and 12a, 12b. The screw 200 extrudes the material of the front and rear arms 11a, 11b and 12a, 12b into compressive frictional engagement with the walls of the aperture 231 to provide the requisite anchoring. Since there is no space between the respective attached rear and front arms 11a, 12a and 11b, 12b, as in the folded anchor of the prior art shown in FIG. 4, the extrusion forces exerted by the screw are directly and fully transmitted to the walls of the aperture for enhanced holding strength.

Figure 7A:
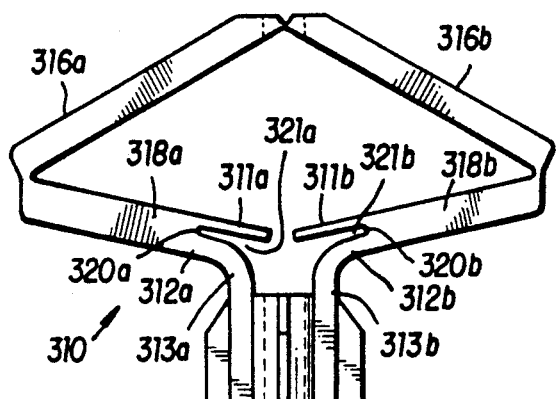
FIGS. 7a–7c similar comparison, as in FIGS. 1, 2 and 5, of an embodiment of another type of anchor having the "space elimination" feature of the present invention when in the folded configuration.
Figure 7B:
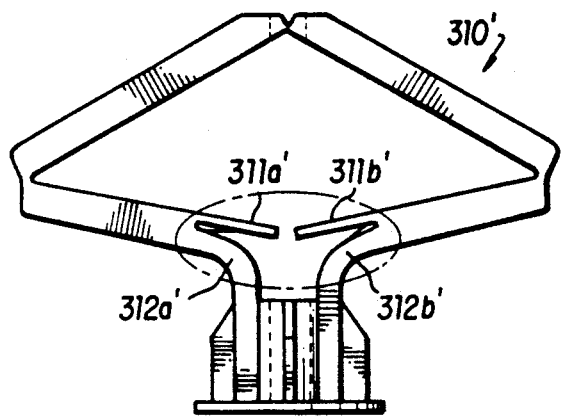
Figure 7D:
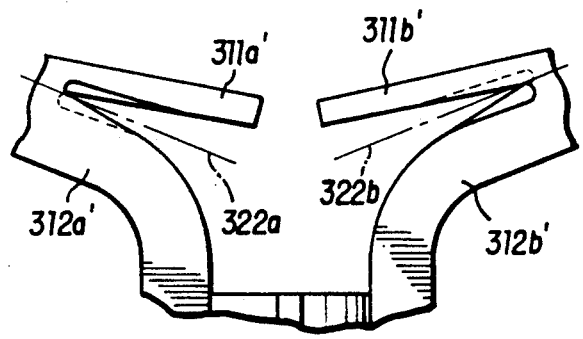
Figure 7C:
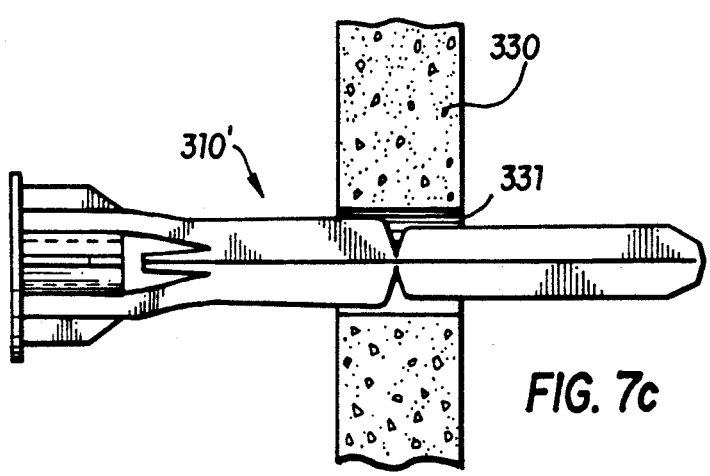

The present invention is similarly applicable to any foldable anchor wherein a radius between folding elements results in a spacing therein which must be accommodated by an insertion aperture. The presently commercially available anchor 310, depicted in U.S. Pat. No. 4,752,170, as shown in FIG. 7a, has front arms 311a, 311b attached to rear arms 312a, 312b. The rear arms in this embodiment are formed from the ends of web elements 313a and 313b. The front arms comprise converging cantilevered extensions from portions 318a and 318b. Attached to the front arms 311a, 311b are forward arms 316a, 316b respectively. For insertion into wall 330, as shown in FIG. 7c, forward arms 316a and 316b are folded together and front arms 311a and 311b are folded together. Radii 320a and 320b between front arms 311a, 311b and rear arms 312a, 312b respectively cause spacings 321a and 321b to be formed and maintained during insertion. Though the spacings are not of the dimension of the anchor shown in FIGS. 1 and 4, they are still, in part, determinative of the size of the aperture 331 in wall 330 for deployment of the anchor, which must be accommodated by the wall aperture. As shown in FIG. 7b and blow up section, The radii between front and rear arms 311a', 311b' and 312a', 312b' are bifurcated and offset from longitudinal planes 322a' and 322b', to provide a similar elimination of spacing 321a and 321b' when the anchor is folded for insertion as shown in FIG. 7c.

It is understood that the fasteners described above and illustrated in the drawings are illustrative of the present invention and are not to be construed as limitations on the present invention. Changes and modifications may be made without departing from the scope of the present invention as defined in the following claims.

What is claimed is:

1. A plastic anchor for fastening objects to a substrate, said anchor being comprised of a base element, having first and second ends, the base element being integrally joined, at its first end, to hingeable web elements extending outwardly away therefrom and merging with an anchoring element comprised of a pair of outstretched rear toggle arms which are in turn each attached to one of a pair of front arms, with an inner radius formed between the front arms and rear toggle arms at each of their respective points of attachment, said front arms converging toward each other to a portion overlying the base element; with the rear and front arms being adapted to be folded together to form a collapsed anchoring element which is insertable into an aperture within the substrate, with a spacing between eac of said front arms and adjacently attached rear arms during said insertion, which spacing is caused by the radius between adjacently attached front arms and rear arms; wherein the improvement comprises that the anchoring element further comprises means for substantially eliminating the spacing between adjacently attached rear and front arms, caused by the radius therebetween, when the rear and front arms are folded together for insertion into the aperture within the substrate wherein the means for substantially eliminating spacing between adjacently attached rear and front arms comprises a sharp apex point of intersection between the adjacently attached rear and front arms whereby adjacent surfaces of the adjacently attached rear and front arms can thereby be brought into substantial abutting contact during the folding together for insertion of the rear and front arms into the aperture of the substrate.

2. The plastic anchor of claim 1 wherein adjacently attached rear and front arms have an inner radius at their point of attachment, and wherein the facing surfaces of the attached rear and front arms, adjacent the inner radius point of attachment, are bifurcated, along a longitudinal axis extending from the base element to the point of attachment, into two areas of adjacent facing surfaces of the attached rear and front arms, with the two areas deviating slightly, in opposite directions, from a plane, between the attached rear and front arms, which bisects the area between adjacent surfaces of the respective front and rear arms, wherein the adjacent crossing of the deviating areas forms said sharp apex point of intersection.

3. The plastic anchor of claim 2 wherein the two areas, deviating slightly in opposite direction, are mirror images of each other relative to the bisecting plane.

4. The plastic anchor of claim 2 wherein the deviation, in opposite directions, of the two areas is substantially only sufficient to provide the sharp apex point of intersection.

5. The plastic anchor of claim 1 wherein the rear arms are thickened by an amount up to about the same dimensions of the eliminated spacing between adjacently attached rear and front arms, whereby the holding strength of the anchor is increased without concomitant increase in the size of the insertion aperture.

6. The plastic anchor of claim 1 wherein the thickness of the rear arms is kept substantially constant and the dimensions of the insertion aperture are reduced by an amount up to about the same dimensions of the eliminated spacing, between adjacently attached rear and front arms, whereby the holding strength of the anchor is maintained with reduction of insertion aperture dimensions.

7. A plastic anchor for fastening objects to a substrate, said anchor being comprised of a base element, having first and second ends, said base element having a bore therethrough extending from the first end to the second end for the threaded insertion of a fastening element therethrough, with the base element being integrally joined, at its first end, to hingeable web elements extending outwardly away therefrom and merging with an anchoring element comprised of a pair of outstretched rear toggle arms which are in turn each attached to one of a pair of front arms, with an inner radius formed between the front arms and rear toggle arms at each of their respective points of attachment, said front arms converging toward each of the to a position overlying the base element on the axis passing through the bore, with the rear and front arms being adapted to be folded together with the front arms being folded between the rear arms, to form a collapsed anchoring element which is insertable into an aperture within the substrate, with a spacing between each of said front arms and adjacently attached rear arms during said insertion, which spacing is caused by the radius between adjacently attached front arms and rear arms; with said front and rear arms being unfolded after being inserted into the aperture of the substrate and said rear arms becoming supportingly engaged with a surface of the substrate adjacent the periphery of the aperture and wherein the fastening element is inserted into the bore at the second end of the base element, through the base element and into engagement with the front arms at their converging position, wherein the improvement comprises that the anchoring element further comprises means for substantially eliminating the spacing between adjacently attached rear and front arms, caused by the radius therebetween, when the rear and front arms are folded together for insertion into the aperture within the substrate wherein the means for substantially eliminating spacing between adjacently attached rear and front arms comprises a sharp apex point of intersection between the adjacently attached rear and front arms whereby adjacent surfaces of the adjacently attached rear and front arms can thereby be brought into substantial abutting contact during folding together for insertion of the rear and front arms into the aperture of the substrate.

8. The plastic anchor of claim 7 wherein the front arms are hingedly connected at the converging position.

9. The plastic anchor of claim 7 wherein the rear arms are each attached to one of a pair of forward arms which converge toward each other to a hinge connection at a position overlying the base element on the axis passing through the bore and on the side of the front arms away from the rear arms, with the fastening element further engaging the forward arms at their hinged point of connection and wherein the forward arms fold together away from the rear and front arms during the insertion.

10. The plastic anchor of claim 8 wherein adjacently attached rear and front arms have an inner radius at their point of attachment, and wherein the facing surfaces of the attached rear and front arms, adjacent the inner radius point of attachment, are bifurcated, along a longitudinal axis extending from the base element to the point of attachment, into two areas of adjacent facing surfaces of the attached rear and front arms, with the two areas deviating slightly, in opposite directions, from a plane, between attached rear and front arms, which bisects the area between adjacent surfaces of the respective front and rear arms, wherein the adjacent crossing of the deviating areas forms said sharp apex point of intersection.

11. The plastic anchor of claim 9 wherein the means for substantially eliminating spacing between adjacently attached rear and fronts arms comprises a sharp apex point of intersection between the adjacently attached rear and front arms whereby adjacent surfaces of the adjacently attached rear and front arms can thereby be brought into substantial touching contact during the folding together for insertion of rear and front arms into the aperture of the substrate.

12. The plastic anchor of claim 11 wherein adjacently attached rear and front arms have an inner radius at their point of attachment, and wherein the facing surfaces of the attached rear and front arms, adjacent the inner radius point of attachment, are bifurcated, along a longitudinal axis extending from the base element to the point of attachment, into two areas of adjacent facing surfaces of the attached rear and front arms, with the two areas deviating slightly, in opposite directions, from a plane, between the attached rear and front arms, which bisects the area between adjacent surfaces of the respective front and rear arms, wherein the adjacent crossing of the deviating areas forms said sharp apex point of intersection.

13. A method for molding the plastic anchor of claim 10 comprising the step of offsetting the adjacent metal mold members, which form the inner radius between rear and front arms and the adjacent facing portions of the rear and front arms, from each other in opposite directions away from the plane.

14. A method for molding the plastic anchor of claim 12 comprising the step of offsetting the adjacent metal mold members, which form the inner radius between rear and front arms and the adjacent facing portions of the rear and front arms, from each other in opposite directions away from the plane.

15. A plastic anchor for fastening objects to a solid substrate, said anchor being comprised of a base element, having first and second ends, said base element having a bore therethrough extending from the first end to the second end for the threaded insertion of a fastening element therethrough, with the base element being integrally joined, at its first end, to hingeable web elements extending outwardly away therefrom and merging with an anchoring element comprised of a pair of outstretched rear toggle arms which are in turn each attached to one of a pair of front arms, with an inner radius formed between the front arms and rear toggle arms at each of their respective points of attachment, said front arms converging toward each other to a position overlying the base element on the axis passing through the bore, with the rear and front arms being adapted to be folded together with the front arms being folded between the rear arms, to form a collapsed anchoring element which is insertable into an aperture within the substrate, with a spacing between each of said front arms and adjacently attached rear arms during said insertion, which spacing is caused by the radius between adjacently attached front arms and rear arms; with the front and rear arms remaining folded within the aperture, wherein the fastening element is inserted into the bore at the second end of the base element, thereafter being threaded through the base element and between the respective pairs of attached front and rear arms, with said front and rear arms being compressingly extruded by the fastening element into compressive frictional engagement with the walls of the aperture; wherein the improvement comprises that the anchoring element further comprises means comprises means for substantially eliminating the spacing between adjacently attached rear and front arms, caused by radius therebetween, when the rear and front arms are folded together within the aperture whereby compressive forces exerted b the fastening element against the rear and front arms are substantially full transmitted to the walls of the aperture wherein the means for substantially eliminating spacing between adjacently attached rear and front arms comprises a sharp apex point of intersection between the adjacently attached rear and front arms whereby adjacent surfaces of the adjacently attached rear and front arms can thereby be brought into substantial abutting contact during folding together for insertion of the rear and front arms into the aperture of the substrate.

16. The plastic anchor of claim 15 wherein adjacently attached rear and front arms have an inner radius at their point of attachment, and wherein th facing surfaces of the attached rear and front arms, adjacent the inner radius point of attachment, are bifurcated, along a longitudinal axis extending from the base element to the point of attachment, into two areas o adjacent facing surfaces of the attached rear and front arms, with the two areas deviating slightly, in opposite directions, from a plane, between attached rear and front arms, which bisects the area between adjacent surfaces of the respective front and rear arms, wherein the adjacent crossing of the deviating areas forms said sharp apex point of intersection.

* * * * *